United States Patent
Morikawa et al.

(10) Patent No.: US 6,947,198 B2
(45) Date of Patent: Sep. 20, 2005

(54) EMISSIVE IMAGE DISPLAY APPARATUS

(75) Inventors: Joe Morikawa, Escondido, CA (US); Ben Russ, San Diego, CA (US)

(73) Assignees: Sony Corporation, Tokyo (JP); Sony Electronics Inc, Park Ridge, NJ (US)

( * ) Notice: Subject to any disclaimer, the term of this patent is extended or adjusted under 35 U.S.C. 154(b) by 208 days.

(21) Appl. No.: 10/112,837

(22) Filed: Mar. 29, 2002

(65) Prior Publication Data

US 2003/0184842 A1 Oct. 2, 2003

(51) Int. Cl.[7] .................. G02B 26/00; H04N 9/31; G03B 21/14
(52) U.S. Cl. .................. 359/291; 348/744; 353/49
(58) Field of Search .................. 359/291; 349/86, 349/88, 95; 353/31, 49; 348/744, 750

(56) References Cited

U.S. PATENT DOCUMENTS

| | | | |
|---|---|---|---|
| 4,794,299 A | 12/1988 | Chiodi et al. ............... 313/402 |
| 4,931,689 A | 6/1990 | Van Uden ................... 313/402 |
| 6,172,797 B1 | 1/2001 | Huibers ....................... 359/291 |
| 6,211,614 B1 | 4/2001 | Katayama et al. .......... 313/582 |
| 6,313,894 B1 * | 11/2001 | Sekine et al. ................. 349/88 |
| 6,370,019 B1 | 4/2002 | Matthies et al. ............ 361/681 |
| 6,407,851 B1 * | 6/2002 | Islam et al. .................. 359/291 |
| 6,498,431 B1 | 12/2002 | Katayama et al. .......... 313/582 |
| 2002/0336677 | 3/2002 | Okada ...................... 315/169.1 |
| 2002/0122260 A1 | 9/2002 | Okazaki et al. ............. 359/636 |
| 2003/0132699 A1 * | 7/2003 | Yamaguchi et al. ........ 313/496 |
| 2003/0174255 A1 * | 9/2003 | Lee et al. .................... 348/744 |

* cited by examiner

Primary Examiner—Scott J. Sugarman
Assistant Examiner—M. Hasan
(74) Attorney, Agent, or Firm—John L. Rogitz

(57) ABSTRACT

A large screen emissive display operating at atmospheric pressure includes pixels, the red, green, and blue subpixels of which are excited by UV laser light scanned onto the subpixels by a pixel activation mechanism. The pixel activation mechanism includes three grating light valves (GLVs) that are controlled by a processor in response to a demanded image to modulate the UV light as appropriate to produce the demanded image.

36 Claims, 1 Drawing Sheet

EMISSIVE IMAGE DISPLAY APPARATUS

FIELD OF THE INVENTION

The present invention relates generally to image displays.

BACKGROUND OF THE INVENTION

Image displays include emissive displays, such as phosphor displays used in cathode tube-based television and computer monitors, and transmissive displays, such as projection displays used for large screen TVs. An emissive display works by emitting visible light from pixels that are excited by, e.g., electron beams or fluorescent lamps. In the case of conventional electron beam-based displays, the electron beam is scanned across the pixels as appropriate to excite the pixels to produce a demanded image. In the case of fluorescent lamp-based displays such as plasma displays, ultraviolet light from a gas discharge is directed to appropriate pixels that are physically shielded from each other, with the pixel illumination pattern necessary to produce the demanded image not being established by scanning the UV light, which is simply a discharge from the lamp, but by appropriately blocking the UV light to impinge only on the desired pixels. Both of the above-mentioned emissive displays require the presence of a vacuum within the device, which can complicate manufacturing and raise costs.

Because the weight of some emissive displays becomes infeasibly large in the case of large screen displays, e.g., displays having sizes of 40"–60" or more, the above-mentioned transmissive displays have been provided, an example of which is the projection display. A projection display works by projecting pixellated light from a relatively small source onto a relatively large projector, which "transmits" the light toward the viewers.

As recognized herein, while effective, large screen projection-type displays suffer from the drawback of relatively low image quality, compared to the image quality afforded by a smaller emissive display. On the other hand, current emissive display technology, as noted above, cannot easily be used to establish large screen displays owing to weight and other practical restrictions.

Nevertheless, the present invention recognizes that it would be desirable to provide a large screen emissive display to overcome the image quality drawback of many large transmissive displays.

SUMMARY OF THE INVENTION

An image display apparatus includes an emissive display that has plural pixels. A source of ultraviolet (UV) light directs UV light to a pixel activation mechanism, which scans the UV light onto the pixels in response to a demanded image.

In a preferred embodiment, the display is a large screen display, and the light source is a UV laser. The display can be a phosphor display, and it can operate at atmospheric pressure. Or, the display can be a liquid crystal display.

In any case, the preferred pixel activation mechanism can include a grating light valve (GLV) that is controllable by a processor to establish a demanded image. In a particularly preferred embodiment, three GLVs are controlled by the processor to establish the demanded image. To render three beams, one for each GLV, a beamsplitter receives UV light from the laser and directs respective UV beams to the GLVs. A first GLV is controlled to direct UV light onto only blue subpixels of the display, a second GLV is controlled to direct UV light onto only red subpixels of the display, and a third GLV is controlled to direct UV light onto only green subpixels of the display.

In the preferred embodiment discussed further below, scanning mirrors are associated with respective GLVs, with each mirror being oscillated about a respective axis, to produce a two-dimensional scan from the one-dimensional modulation afforded by the GLVs. Additionally, a mask that has excitation light apertures defining respective pitches can be interposed between the GLVs and the display. If desired, the pitches between the excitation light apertures are established based on the locations of the respective excitation light apertures relative to the display.

If desired, the display can include a substrate on which pixels are established. Each pixel is established by respective red, green, and blue subpixels. A light refracting layer can cover the pixels. In this embodiment, the pixel activation mechanism directs first, second, and third UV beams against the refracting layer at respective first, second, and third angles, whereby the first, second, and third beams are refracted by the refracting layer only onto respective red, green, and blue subpixels. To ensure color purity, a variable pitch color selection mask layer can be juxtaposed with the refracting layer for shielding the blue and green subpixels from the first beam, shielding the red and green subpixels from the second beam, and shielding the red and blue subpixels from the third beam.

In another aspect, a method for producing a demanded image includes receiving the demanded image, and directing light onto a display using plural light valves. The light valves are controlled in accordance with the demanded image.

In still another aspect, a video display apparatus is disclosed for presenting a demanded image. The apparatus includes a phosphor display operating at atmospheric pressure, a UV laser beam source, and first, second, and third grating light valves (GLVs) directing respective first, second, and third beams from the laser beam source onto the display to activate respective red, blue, and green subpixels of the display. A processor operably controls the GLVs in accordance with the demanded image.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
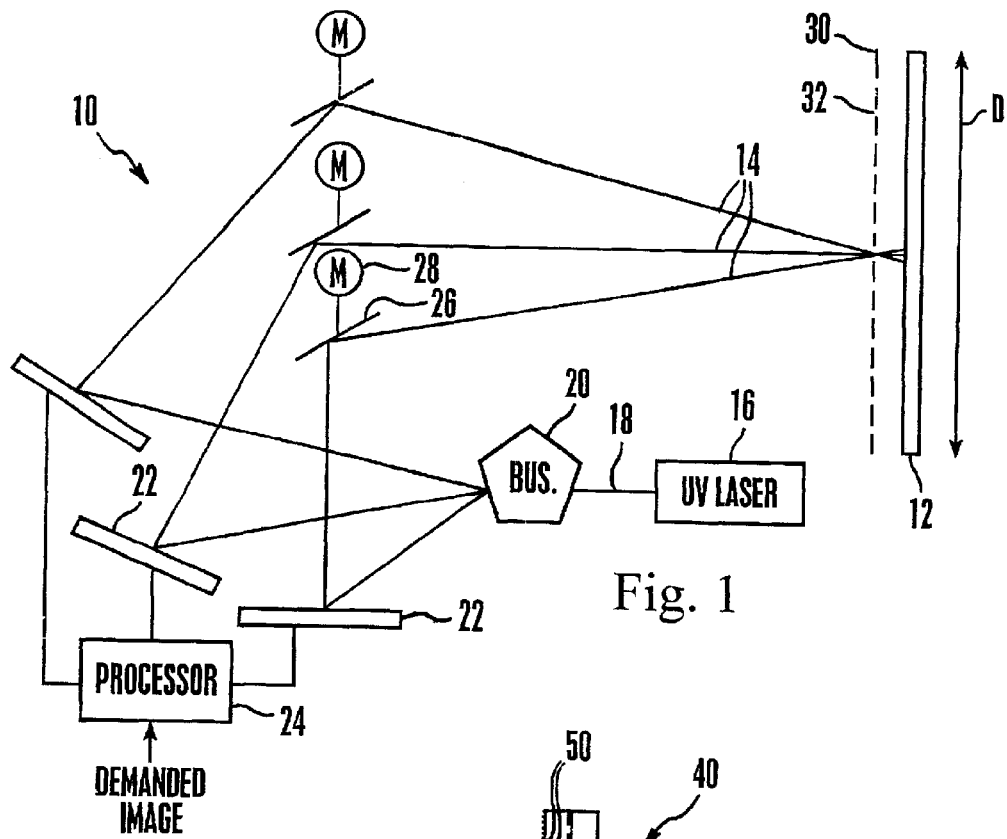
FIG. 1 is a schematic diagram of the present emissive display, using a phosphor screen.

Referring initially to FIG. 1, a display apparatus is shown, generally designated 10, which includes an emissive display 12 that defines plural pixels, each pixel in turn being defined by three subpixels in accordance with emissive display principles known in the art, namely, red, green, and blue subpixels. In the non-limiting illustrative embodiment shown in FIG. 1, the display 12 is a large screen phosphor display, the pixels of which may be composed of, e.g., Zinc Sulfide. By "large screen" is meant that the operational "D" of the display 12 is at least forty inches (40") (about one hundred centimeters) and can be sixty inches (60") (about one hundred fifty centimeters) or more. The principles advanced herein, however, can be applied to smaller displays, as well as to other emissive displays, such as plasma displays. In any case, owing to the structure disclosed below, the display 12 operates at atmospheric pressure, i.e., the display 12 does not require a vacuum in which to operate.

As can be appreciated in reference to FIG. 1, the display 12 is irradiated by plural moving light beams 14. In the preferred embodiment, first through third beams 14 are used. As disclosed further below, a first one of the beams 14 can irradiate only red subpixels, a second one of the beams 14 can irradiate only green subpixels, and a third one of the beams 14 can irradiate only blue subpixels. In the presently preferred embodiment, the beams 14 are ultraviolet (UV) beams and more preferably are UV laser beams that originate at a laser 16.

Explaining FIG. 1 from the laser 16, a source beam 18 is emitted by the laser 16 that is split into the three beams 14 by a beamsplitter 20 device. The beamsplitter device 20 can include two beamsplitters, one of which splits the source beam 18 in two and another of which splits one of the resulting two beams into two beams, to establish the preferred three beam arrangement shown.

The three beams 14 then propagate toward respective light valves 22. In the preferred embodiment, the light valves 22 are grating light valves (GLVs). In non-limiting examples, the GLVs may be those disclosed in U.S. Pat. No. 5,311,360, incorporated herein by reference, or in [insert Sony patents here].

Accordingly, the light valves 22 reflect their respective beams 14 in accordance with light valve principles known in the art. Specifically, each light valve 22 can include a one-dimensional row of movable mirrors which can reflect light. In a particularly preferred, non-limiting embodiment, six adjacent mirrors per subpixel are used. A processor 24 is operably engaged with the light valves 22 to cause each valve 22 to modulate its respective beam 14 in accordance with a demanded image received from, e.g., a television tuner, a computer, or other video source. That is, the mirrors of the light valves 22 are moved as appropriate to reflect or not the respective beam 14, to thereby establish the position of the beam 14 in the dimension defined by the light valves 22 for any given frame of the demanded image.

Thus, the beams 14 are essentially scanned in one dimension in accordance with the demanded image. To achieve the requisite two-dimensional scan, each beam 14 propagates from its respective light valve 22 to a respective scanning mirror 26, each of which oscillates about its axis as driven by a respective motor 28 in a dimension that is orthogonal to the dimension of the light valves 22. The scanning mirrors 26 need not be controlled in accordance with the demanded image; rather, only the light valves 22 need be controlled to produce the demanded image, with the processor 24 taking account of the orthogonal scanning of the beams 14 provided by the scanning mirrors 26.

If desired, a mask 30 can be interposed between the scanning mirrors 26 and the display 12 to establish a light barrier between adjacent pixels. The mask 30 defines a two-dimensional grid of differently-sized excitation light apertures 32. The mask 30 can include an opaque substrate and the apertures 32 can be established by openings in the substrate. Alternatively, the mask 30 can include a transparent substrate and the apertures can be established by ink-jet printing an opaque pattern on the substrate, with non-printed portions of the substrate establishing the apertures.

Figure 2:
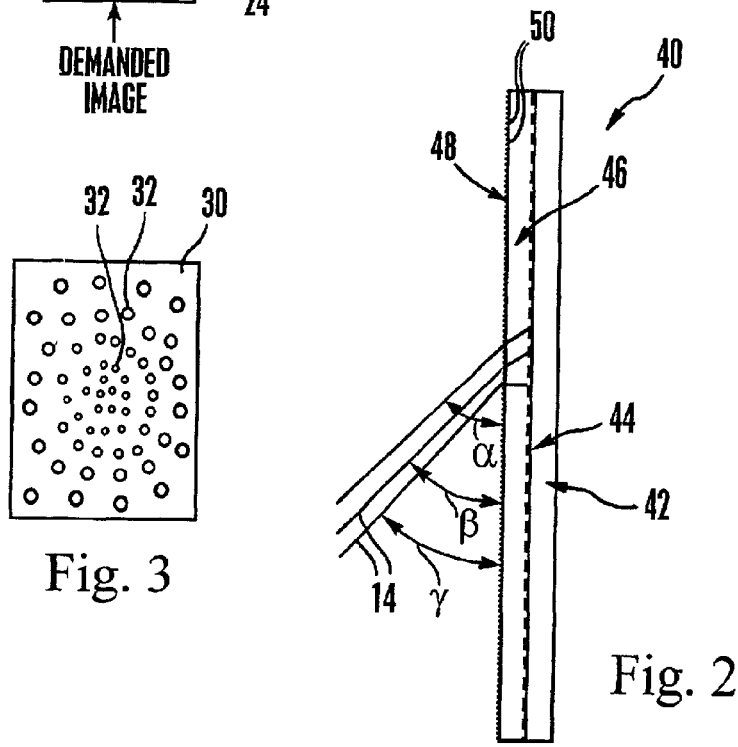
FIG. 2 is a schematic diagram of the variable pitch mask.

As best shown in FIG. 2, the sizes of the excitation light apertures 32 and/or pitch (that is, the spacing between adjacent excitation light apertures 32) are established based on the locations of the respective excitation light apertures 32 relative to the display 12. Specifically, to allow for uniform radiation intensity of pixels near the center of the display 12 and pixels near the edges of the display 12, the size and/or pitch of the excitation light apertures 32 can change from the center of the display 12 outward. Accordingly, in one non-limiting embodiment the sizes of the excitation light apertures 32 and/or the spacing between excitation light apertures 32 that are near the center of the display 12 can be smaller than the sizes of the excitation light apertures 32 and/or the spacing between excitation light apertures 32 that are nearer the edges of the display 12. The particular excitation light aperture size/pitch variation is established based on the geometry of the system 10.

Figure 3:
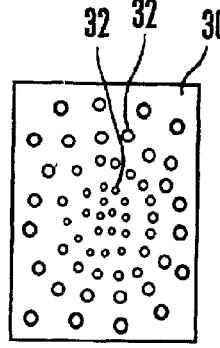
FIG. 3 is a schematic diagram of an alternate phosphor screen assembly.

FIG. 3 shows an alternate display, generally designated 40, which includes a transparent, e.g., glass, substrate 42 and plural red, green, and blue subpixels 44 that are established on the substrate 42. It is to be understood that three adjacent subpixels establish a pixel. A transparent light refracting layer 46 covers the pixels and is opposed to the substrate 42 as shown. If desired, the layer 46 can be made of plural sublayers, i.e., a first sublayer for refracting a beam that is to excite only red subpixels, a second sublayer for refracting a beam that is to excite only green subpixels, and a third sublayer for refracting a beam that is to excite only blue subpixels.

In any case, as shown in FIG. 3, the UV beams 14 are directed against the refracting layer 46. The location and configuration of the light valves 22 relative to the display 12 and the light valve control afforded by the processor 24 ensures that the light valve 22 that is to reflect the beam for exciting only red subpixels reflects the beam at a set of angles $\alpha$ with respect to the plane of the light refracting layer 46, the light valve 22 that is to reflect the beam for exciting only green subpixels reflects the beam at a set of angles $\beta$, and the light valve 22 that is to reflect the beam for exciting only blue subpixels reflects the beam at a set of angles $\gamma$, with the angles $\alpha$, $\beta$, and $\gamma$ for any one pixel being different from each other. Consequently, the three beams are refracted at differing angles by the refracting layer 46 only onto respective red, green, and blue subpixels 44.

To ensure that the three beams impinge on only their intended subpixels, a color selection mask layer 48 can be juxtaposed with the refracting layer 46 for shielding the blue and green subpixels from the first beam, shielding the red and green subpixels from the second beam, and shielding the red and blue subpixels from the third beam. The color selection mask layer 48 can be deposited onto the refracting later 46 as one or more thin films by, e.g., ink jet printing the film onto the refracting layer 46. Like the mask 30 shown in FIG. 1, the color selection mask layer 48 can define apertures 50 that have a variable pitch and/or variable size, based on the positions of the apertures 50 relative to the center of the substrate 42.

While the particular EMISSIVE IMAGE DISPLAY APPARATUS as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for" or, in the case of a method claim, the element is recited as a "step" instead of an "act".

What is claimed is:

1. An image display apparatus, comprising:
   an emissive display having plural pixels;
   at least one source of ultraviolet (UV) light; and
   a pixel activation mechanism scanning the UV light onto the pixels in response to a demanded image, wherein the display includes at least one substrate, plural pixels being established on the substrate, each pixel being established by respective red, green, and blue subpixels, at least one light refracting layer covering the pixels and opposed to the substrate.

2. The apparatus of claim 1, wherein the display is a large screen display.

3. The apparatus of claim 1, wherein the display is a phosphor display.

4. The apparatus of claim 3, wherein the phosphor display operates at atmospheric pressure.

5. The apparatus of claim 1, wherein the display is a liquid crystal display.

6. The apparatus of claim 1, wherein the pixel activation mechanism includes at least one grating light valve (GLV) controllable by a processor to establish a demanded image.

7. The apparatus of claim 6, comprising plural GLVs controllable by a processor to establish the demanded image.

8. The apparatus of claim 7, comprising at least one beamsplitter receiving UV light from the source and directing respective UV beams to the GLVs.

9. The apparatus of claim 7, comprising plural scanning mirrors, each mirror being associated with a respective GLV, each mirror being oscillated about a respective axis.

10. The apparatus of claim 9, comprising three and only three GLVs, a first GLV being controlled to direct UV light onto only blue subpixels of the display, a second GLV being controlled to direct UV light onto only red subpixels of the display, and a third GLV being controlled to direct UV light onto only green subpixels of the display.

11. The apparatus of claim 7, further comprising at least one mask having plural excitation light apertures defining respective pitches, the mask being interposed between the GLVs and the display, the pitches between the excitation light apertures being established based on the locations of the respective excitation light apertures relative to the display.

12. The apparatus of claim 11, wherein the pixel activation mechanism directs first, second, and third UV beams against the refracting layer at respective first, second, and third angles, whereby the first, second, and third beams are refracted by the refracting layer only onto respective red, green, and blue subpixels.

13. The apparatus of claim 12, further comprising a color selection mask layer juxtaposed with the refracting layer for shielding the blue and green subpixels from the first beam, shielding the red and green subpixels from the second beam, and shielding the red and blue subpixels from the third beam.

14. The apparatus of claim 1, wherein the source is a laser.

15. A method for producing a demanded image, comprising:
    receiving the demanded image; and
    directing light onto a display using plural light valves, the light valves being controlled in accordance with the demanded image.

16. The method of claim 15, wherein the light valves are gracing light valves (GLVs), and the light is UV light.

17. The method of claim 16, wherein the act of directing includes modulating the CV light using the GLVs in accordance with the demanded image.

18. The method of claim 17, further comprising interposing oscillating scanning mirrors between the GLVs and the display.

19. The method of claim 17, wherein the display is a large screen display.

20. The method or claim 19, wherein the display is a phosphor display.

21. The method of claim 20, comprising operating the phosphor display at atmospheric pressure.

22. The method of claim 19, wherein the display is a liquid crystal display.

23. The method of claim 17, comprising:
    generating a single UV light beam using a laser; and
    splitting the single UV light beam into three light beams impinging on respective GLVs.

24. The method of claim 23, comprising:
    directing a first light beam only onto red subpixels in the display;
    directing a second light beam only onto green subpixels in the display; and
    directing a third light beam only onto blue subpixels in the display.

25. The method of claim 16, further comprising interposing between the GLVs and the display at least one mask having plural excitation light apertures defining respective pitches, the pitches between the excitation light apertures being established based on the locations of the respective excitation light apertures relative to the display.

26. A video display apparatus for presenting a demanded image, comprising:
    a phosphor display operating at atmospheric pressure;
    at least one UV laser beam source;
    at least first, second, and third grating light valves (GLVs) directing respective first, second, and third beams from the laser beam source onto the display to activate respective red, blue, and green subpixels of the display; and
    at least one processor operably controlling the GLVs in accordance with the demanded image.

27. The apparatus of claim 26, wherein the display is a large screen display.

28. The apparatus of claim 27, wherein the display has at least one operational dimension of at least forty inches (40").

29. The apparatus of claim 27, wherein the display has at least one operational dimension of at least fifty inches (50").

30. The apparatus of claim 27, wherein the display has at least one operational dimension of at least sixty inches (60").

31. The apparatus of claim 26, comprising at least one beamsplitter receiving UV light from the source and directing respective UV beams to the GLVs.

32. The apparatus of claim 26, comprising plural scanning mirrors, each mirror being associated with a respective GLV, each mirror being oscillated about a respective axis.

33. The apparatus of claim 26, further comprising at least one mask having plural excitation light apertures defining respective pitches, the mask being interposed between the GLVs and the display, the pitches between the excitation light apertures being established based on the locations of the respective excitation light apertures relative to the display.

34. The apparatus of claim 26, wherein the display includes at least one substrate, plural pixels being established on the substrate, each pixel being established by respective red, green, and blue subpixels, at least one light refracting layer covering the pixels and opposed to the substrate.

35. The apparatus of claim 34, wherein the first, second, and third beams impinge against the refracting layer at respective first, second, and third angles, whereby the first, second, and third beams are refracted by the refracting layer only onto respective red, green, and blue subpixels.

36. The apparatus of claim 35, further comprising a color selection mask layer juxtaposed with the refracting layer for shielding the blue and green subpixels from the first beam, shielding the red and green subpixels from the second beam, and shielding the red and blue subpixels from the third beam.

* * * * *